Patented Aug. 4, 1925.

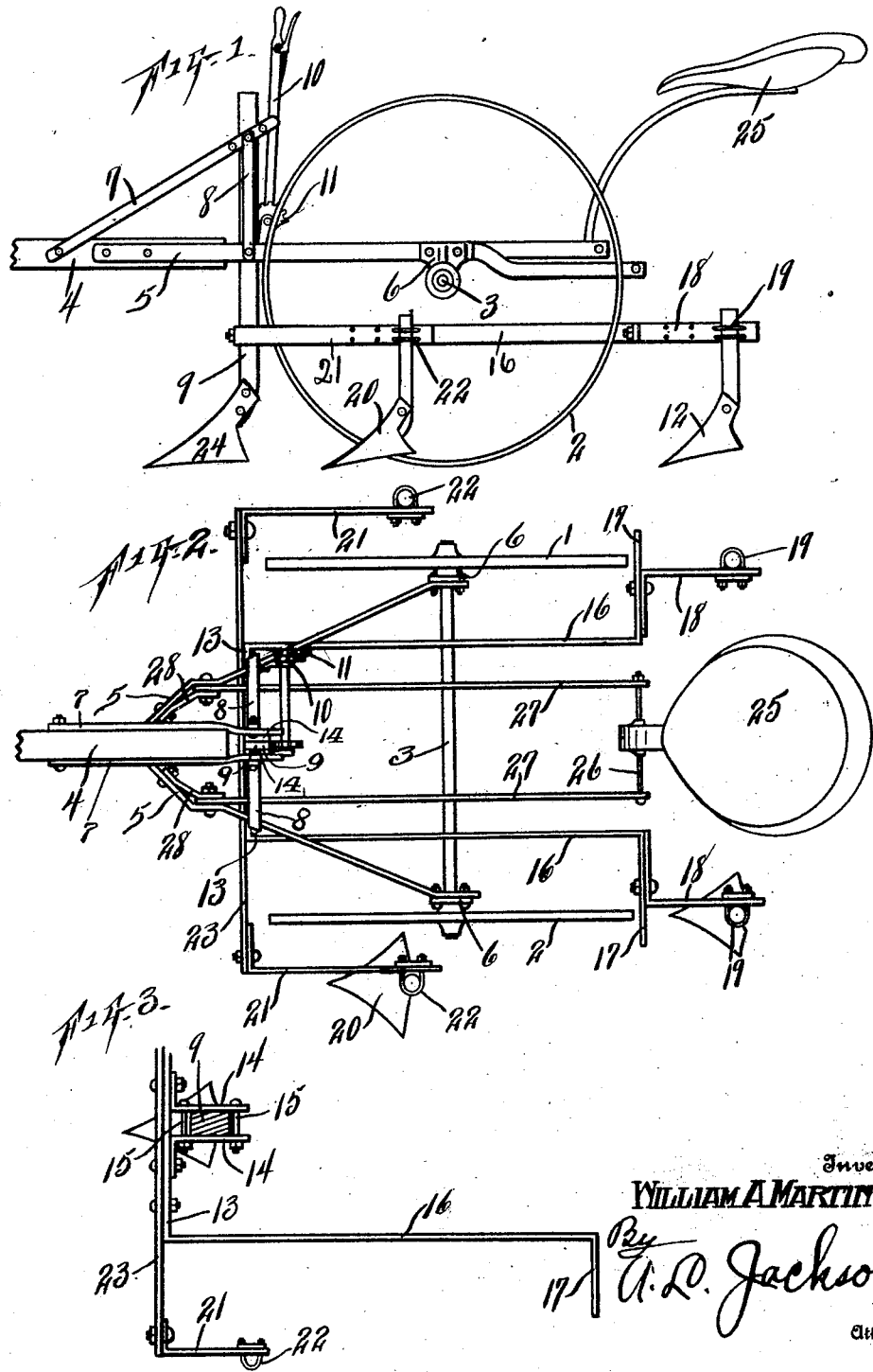

1,548,622

UNITED STATES PATENT OFFICE.

WILLIAM A. MARTIN, OF WAXAHACHIE, TEXAS.

CROSS-PLOWING CULTIVATOR.

Application filed June 14, 1923. Serial No. 645,449.

*To all whom it may concern:*

Be it known that I, WILLIAM A. MARTIN, a citizen of the United States, residing at Waxahachie, in the county of Ellis and State of Texas, have invented certain new and useful Improvements in Cross-Plowing Cultivators, of which the following is a specification.

My invention relates to cultivators and more particularly to cross-plowing cultivators; and the object is to provide certain simple cultivating devices which can be readily and quickly attached to such implements as cotton planters and which can be used to advantage for cross-plowing young plants, such as cotton, sugar beets, milo maize, sorghum, and other young plants which should be thinned out or blocked. Other objects and advantages will be fully explained in the following description and the invention will be more particularly pointed out in the claims.

Reference is had to the accompanying drawings which form a part of this application.

Fig. 1 is a side elevation of the cultivator. Fig. 2 is a plan view of the same. Fig. 3 is a broken plan view of certain parts.

Similar characters of reference are used to indicate the same parts throughout the several views.

This invention includes a two wheeled truck, having wheels 1 and 2 which support an axle 3. The tongue 4 is braced by the draft bars 5 which are attached to the tongue 4 and connected to the axle 3 by the bearings 6 which engage the axle and which are bolted to the draft bars 5. The tongue 4 and the draft members 5 are further braced by the bars 7 and 8. The tongue 4 and the draft members 5 and the braces 7 and 8 constitute the ordinary frame. The beam 9 is vertically adjustable in the usual manner by a lever 10 and ratchet 11.

The improvements herein set forth are supported on the beam 9. Draft beams for the plows 12 are provided by a single bar 13 which is located in front of the beam 9. Brackets 14 are bolted to the beam 13 and extended back on each side of the beam 9 and the beam 9 is clamped in between the brackets 14 and the bolts 15. In this manner, the bar 13 is attached rigidly to the beam 9 and is adjustable vertically therewith. The beam 13 has backwardly extended draft members 16 which have right angle extensions 17 to which the plows 12 are connected by the brackets 18. The plows 12 are connected to the brackets 18 by U-bolts 19. Plows 20 are connected to draft members or beams 21 by U-bolts 22. The draft beams 21 are bolted to the cross-bar 23 which is bolted to bar 13. The beam 9 carries a plow 24. The plows 12 and 20 are carried rigidly with the plow 24 and when the plow 24 is elevated or moved vertically, all the plows 12 and 20 will be moved vertically. The seat 25 is supported on a frame which has a cross-bar 26 which is connected to longitudinal members 27. The members 27 extend forward and rest on the axle 3 and are connected to draft members 5 by braces 28.

The improvements herein set forth may be attached to the trucks used for planting cotton seed. Various changes may be made in the construction, proportions, and arrangements of the several parts without departing from my invention.

What I claim, is,—

1. A cross-plowing cultivator comprising a wheeled truck and a frame therefor, a vertically disposed plow beam braced by said frame, braces connected with said truck frame and extending upwardly and backwardly for bracing said plow beam, means for vertically adjusting said plow beam, a supplemental plow beam horizontally disposed and having a transverse member in front of said vertical plow beam and rigidly attached thereto and having backwardly extended members provided with lateral extensions, and brackets for attaching plows to said lateral extensions.

2. A cross-plowing cultivator comprising a wheeled truck and a frame therefor, a vertically disposed plow beam braced by said frame, braces connected with the truck frame for bracing the upper part of said plow beam above said truck frame, means for vertically adjusting said plow beam, a supplemental plow beam horizontally disposed and having a member in front of said plow beam rigidly attached thereto and having backward extensions provided with lateral extensions, brackets for attaching plows to said lateral extensions, a transverse beam in front of said supplemental plow beam and rigidly attached thereto, and L-shaped brackets attached thereto for attaching plows to said transverse beam.

In testimony whereof, I set my hand, this 23rd day of May, 1923.

WILLIAM A. MARTIN.